United States Patent
Kim et al.

(10) Patent No.: US 10,479,870 B2
(45) Date of Patent: Nov. 19, 2019

(54) METHOD FOR MANUFACTURING POLARIZER AND POLARIZER MANUFACTURED THEREBY

(71) Applicant: LG CHEM, LTD., Seoul (KR)

(72) Inventors: Ji Young Kim, Daejeon (KR); Ji Young Kim, Daejeon (KR); Hye Min Yu, Daejeon (KR); Kyun Il Rah, Daejeon (KR); Jin Yong Park, Daejeon (KR); Eungki Lee, Daejeon (KR); Taek Geun Nam, Daejeon (KR)

(73) Assignee: LG Chem, Ltd., Seoul (KR)

(*) Notice: Subject to any disclaimer, the term of this patent is extended or adjusted under 35 U.S.C. 154(b) by 152 days.

(21) Appl. No.: 15/572,685

(22) PCT Filed: Jun. 3, 2016

(86) PCT No.: PCT/KR2016/005953
§ 371 (c)(1),
(2) Date: Nov. 8, 2017

(87) PCT Pub. No.: WO2016/195440
PCT Pub. Date: Dec. 8, 2016

(65) Prior Publication Data
US 2018/0134854 A1 May 17, 2018

(30) Foreign Application Priority Data
Jun. 3, 2015 (KR) .................. 10-2015-0078294

(51) Int. Cl.
*C08J 3/24* (2006.01)
*G02B 5/30* (2006.01)
(Continued)

(52) U.S. Cl.
CPC ........... *C08J 3/24* (2013.01); *B29D 11/00644* (2013.01); *B32B 27/08* (2013.01); *B32B 27/306* (2013.01);
(Continued)

(58) Field of Classification Search
CPC .......... C08J 3/24; C08J 3/243; C08J 2329/04; B29D 11/00644; B32B 27/06;
(Continued)

(56) References Cited

U.S. PATENT DOCUMENTS

2008/0192345 A1  8/2008  Mochizuki et al.
2008/0278810 A1  11/2008  Kim et al.
(Continued)

FOREIGN PATENT DOCUMENTS

JP       06-034816 A      2/1994
JP       2002-333523 A    11/2002
(Continued)

*Primary Examiner* — Stephone B Allen
*Assistant Examiner* — Adam W Booher
(74) *Attorney, Agent, or Firm* — Dentons US LLP (57) ABSTRACT

The present specification relates to a method for manufacturing a polarizer, the method including: a step of dyeing at least one dye of iodine and dichroic dyes on a polyvinyl alcohol-based film; a first cross-linking step of cross-linking the polyvinyl alcohol-based film and the dye by using a first aqueous solution including a polyvalent carboxylic acid compound and a boron compound; a second cross-linking step of cross-linking the polyvinyl alcohol-based film and the dye by using a second aqueous solution including a polyvalent carboxylic acid compound and a boron compound; and a third cross-linking step of cross-linking the polyvinyl alcohol-based film and the dye by using a third aqueous solution including a polyvalent carboxylic acid compound, in which in the first cross-linking step and the second cross-linking step, stretching is performed along (Continued)

with cross-linking, and a polarizer manufactured by using the same.

17 Claims, 2 Drawing Sheets

(51) Int. Cl.
| | |
|---|---|
| *B29D 11/00* | (2006.01) |
| *B32B 27/08* | (2006.01) |
| *B32B 27/30* | (2006.01) |
| *D06P 3/58* | (2006.01) |
| *D06P 7/00* | (2006.01) |
| *D06P 1/653* | (2006.01) |
| *D06P 1/673* | (2006.01) |
| *G02B 1/14* | (2015.01) |
| *B29K 29/00* | (2006.01) |
| *G02F 1/1335* | (2006.01) |
| *D06P 1/00* | (2006.01) |

(52) U.S. Cl.
CPC ............ *B32B 27/308* (2013.01); *D06P 1/653* (2013.01); *D06P 1/673* (2013.01); *D06P 3/58* (2013.01); *D06P 7/005* (2013.01); *G02B 5/30* (2013.01); *B29K 2029/04* (2013.01); *B32B 2307/42* (2013.01); *C08J 2329/04* (2013.01); *D06P 1/0076* (2013.01); *D06P 1/6533* (2013.01); *D06P 1/67316* (2013.01); *G02B 1/14* (2015.01); *G02F 1/133528* (2013.01); *G02F 2201/50* (2013.01)

(58) Field of Classification Search
CPC ....... B32B 27/08; B32B 27/30; B32B 27/306; B32B 27/308; B32B 2307/42; D06P 1/0076; D06P 1/653; D06P 1/6533; D06P 1/673; D06P 1/67316; D06P 3/58; D06P 7/00; D06P 7/005; G02B 5/30; G02B 5/3025; G02B 5/3033; G02B 5/3041; G02B 5/305; G02B 1/105; G02B 1/14; B29K 2029/04; B29K 2031/04; G02F 1/133528; G02F 2201/50
See application file for complete search history.

(56) References Cited

U.S. PATENT DOCUMENTS

| | | |
|---|---|---|
| 2009/0323185 A1 | 12/2009 | Goto et al. |
| 2013/0314786 A1 | 11/2013 | Higeta et al. |

FOREIGN PATENT DOCUMENTS

| | | |
|---|---|---|
| JP | 2007-122050 A | 5/2007 |
| JP | 2009-244863 A | 10/2009 |
| JP | 2010-033007 A | 2/2010 |
| JP | 2011-257756 A | 12/2011 |
| JP | 2013-178356 A | 9/2013 |
| JP | 2015-094906 A | 5/2015 |
| KR | 10-2007-0078734 A | 8/2007 |
| KR | 10-2008-0000349 A | 1/2008 |
| KR | 10-2008-0005357 A | 1/2008 |
| KR | 10-2011-0135321 A | 12/2011 |
| KR | 10-2014-0019310 A | 2/2014 |
| WO | 2006/095815 A1 | 9/2006 |

| | CRACK OCCURRENCE RATE | PHOTOGRAPH |
|---|---|---|
| EXAMPLE 1 | 0 |  |
| EXAMPLE 3 | 0 |  |
| COMPARATIVE EXAMPLE 1 | 67 |  |
| COMPARATIVE EXAMPLE 5 | 50 |  |

METHOD FOR MANUFACTURING POLARIZER AND POLARIZER MANUFACTURED THEREBY

TECHNICAL FIELD

This application is a National Stage Entry of International Application No. PCT/KR2016/005953 filed on Jun. 3, 2016, and claims the benefit of Korean Application No. 10-2015-0078294 filed on Jun. 3, 2015, all of which are hereby incorporated by reference in their entirety for all purposes as if fully set forth herein.

The present specification relates to a method for manufacturing a polarizer and a polarizer manufactured by using the same.

BACKGROUND ART

A liquid crystal display device is a display visualizing polarization by a switching effect of a liquid crystal, and has been used in various categories ranging from small and medium displays, such as a wrist watch, an electronic calculator, and a mobile phone, to a large-scale TV.

Currently, as a considerable number of polarizing plates mass-produced and commercialized for display devices, a matter, which is obtained by joining a protective film which is optically transparent and has a mechanical strength onto both surfaces or one surface of a polarizing film (polarizer) formed by coloring a dichromatic material such as iodine or a dichroic dye on a base film formed of a polyvinyl alcohol-based film, followed by cross-linking by a boron compound and stretching and aligning, has been used.

However, there is a problem in that in a stretched polyvinyl alcohol-based film polarizer, under a durability condition such as a high temperature and a high humidity, shrinkage deformation easily occurs. When the polarizer is deformed, there occur problems in that stress thereof affects the protective film and causes bending, and as a result, a change in physical property of the polarizing plate including the polarizer and a light leakage phenomenon in a liquid crystal display device are caused.

The boron compound generally used in a cross-linking step of a process for manufacturing the polarizer has a short cross-linking chain, and thus, causes significant width shrinkage by a stretching process, and the significant width shrinkage becomes a main reason for shrinkage deformation of the polarizer. In order to solve this, a method for using an organic cross-linking agent in addition to the boron compound, specifically, a method for performing a cross-linking treatment with a polyvalent aldehyde compound has been proposed. However, aldehyde has a peculiar odor and a problem in terms of handling stability. Further, a method for performing a cross-linking treatment with a polyvalent carboxylic acid compound has been proposed, but does not have a sufficient improvement effect of shrinkage deformation of the polarizer.

DETAILED DESCRIPTION OF THE INVENTION

Technical Problem

The present specification has been made in an effort to provide a method for manufacturing a polarizer and a polarizer manufactured by using the same.

Technical Solution

An exemplary embodiment of the present specification provides a method for manufacturing a polarizer, the method including: a step of dyeing at least one dye of iodine and dichroic dyes on a polyvinyl alcohol-based film;

a first cross-linking step of cross-linking the polyvinyl alcohol-based film and the dye by using a first aqueous solution including a polyvalent carboxylic acid compound and a boron compound;

a second cross-linking step of cross-linking the polyvinyl alcohol-based film and the dye by using a second aqueous solution including a polyvalent carboxylic acid compound and a boron compound; and a third cross-linking step of cross-linking the polyvinyl alcohol-based film and the dye by using a third aqueous solution including a polyvalent carboxylic acid compound, in which in the first cross-linking step and the second cross-linking step, stretching is performed along with cross-linking.

An exemplary embodiment of the present specification also provides a polarizer manufactured according to the method for manufacturing a polarizer.

An exemplary embodiment of the present specification also provides a polarizer including a boron element in an amount of 0.5 wt % to 5 wt % based on 100 wt % of the polarizer.

Further, an exemplary embodiment of the present specification provides a polarizing plate including the polarizer.

An exemplary embodiment of the present specification also provides a polarizing plate having a crack occurrence rate of 5% or less after a durability evaluation under a condition of being left to stand at any one temperature selected from 80° C. to 120° C. for 24 hours.

In addition, an exemplary embodiment of the present specification provides an image display device including: a display panel; and the polarizing plate attached onto one surface or both surfaces of the display panel.

Advantageous Effects

A method for manufacturing a polarizer according to an exemplary embodiment of the present specification may manufacture a polarizer having excellent dimensional stability, durability, and the like.

Further, a polarizing plate including a polarizer according to an exemplary embodiment of the present specification has an advantage of a low crack occurrence rate under a high-temperature durability condition. As a result, there is an advantage in that a light leakage phenomenon problem may be prevented in a liquid crystal display device including the polarizing plate, and the like.

In addition, the polarizer according to an exemplary embodiment of the present specification has an excellent effect of improving shrinkage deformation, thereby efficiently enabling the polarizer to be thin-filmed.

Furthermore, the polarizer according to an exemplary embodiment of the present specification has an excellent handling property.

BEST MODE

Hereinafter, the present specification will be described in more detail.

A method for manufacturing a polarizer according to an exemplary embodiment of the present specification includes first and second cross-linking steps, and each step uses an aqueous solution including a polyvalent carboxylic acid compound and a boron compound. By including a polyvalent carboxylic acid compound which is an organic cross-linking agent in addition to a boron compound which is an inorganic cross-linking agent, it is possible to obtain an effect of alleviating the width shrinkage of a film caused by cross-linking, and also reducing the shrinkage rate under heat resistant conditions. However, when the polyvalent carboxylic acid compound in addition to the boron compound is added only in the first cross-linking step and only the boron compound is added in the second cross-linking step, the polyvalent carboxylic acid compound is washed out away in the second cross-linking step in a state where the cross-linking reaction of the polyvalent carboxylic acid compound is not sufficiently performed, and as a result, the effect of adding the polyvalent carboxylic acid compound is significantly decreased. Further, when only the boron compound is added in the first cross-linking step and the polyvalent carboxylic acid compound in addition to the boron compound is added only in the second cross-linking step, an effect in that the polyvalent carboxylic acid compound is added in the film is reduced because a part of the cross-linking reaction by the boron compound first occurs, and then the reaction product is immersed in the aqueous solution including the polyvalent carboxylic acid compound. Meanwhile, when both the boron compound and the polyvalent carboxylic acid compound are included in the first cross-linking step and the second cross-linking step, there is an advantage in that the cross-linking may be formed because both the compounds are uniformly distributed in the film. As a result, when the first and second cross-linking steps are performed by using an aqueous solution including both a boric acid compound and a polyvalent carboxylic acid compound, it is possible to alleviate the width shrinkage of the polarizer by cross-linking and efficiently reinforce the improvement in shrinkage deformation under heat resistant conditions while maintaining excellent optical properties. Meanwhile, in the first cross-linking step and the second cross-linking step, stretching is performed along with cross-linking. That is, the first and second cross-linking steps are a first cross-linking and stretching step and a second cross-linking and stretching step, respectively.

A polarizer having excellent dimensional stability may be manufactured by performing the first and second cross-linking and stretching steps using an aqueous solution including both a polyvalent carboxylic acid compound and a boron compound. Specifically, it is possible to manufacture a polarizer having a much better effect of improving shrinkage deformation in a small thickness.

However, when only the first cross-linking step and the second cross-linking step are performed and the third cross-linking step is not performed, there occurs a phenomenon in which boron crystals are precipitated and remain on the surface of the film, and when a step of cleaning the film is additionally performed in order to solve the phenomenon, boric acid and polyvalent carboxylic acid in the polyvinyl alcohol-based film also slip out.

In the method for manufacturing a polarizer according to an exemplary embodiment of the present specification, a third cross-linking step is performed after the first and second cross-linking steps in order to solve the phenomenon.

Specifically, the method for manufacturing a polarizer according to an exemplary embodiment of the present specification includes a third cross-linking step which is performed by using a third aqueous solution including a polyvalent carboxylic acid compound after the first and second cross-linking steps. Specifically, the third aqueous solution does not include a boron compound unlike the first and second aqueous solutions.

In this case, in the third cross-linking step, stretching is not performed unlike the first and second cross-linking steps. When the third cross-linking step is performed by using the third aqueous solution including the polyvalent carboxylic acid compound after the stretching step, it is possible to prevent a boron compound from being precipitated on the surface thereof or the width shrinkage caused by a cross-linking reaction in which the cross-linking chains of the boron compound are short by removing the boron compound remaining on the surface of the polyvinyl alcohol-based film, and as a result, there is an effect in that a surface defect of the polyvinyl alcohol-based film may be reduced. Furthermore, since the cross-linking reaction of a hydroxy group of polyvinyl alcohol may be reinforced due to the addition of the polyvalent carboxylic acid compound, an effect of improving shrinkage deformation may be more efficiently exhibited.

Meanwhile, the polyvalent carboxylic acid compound may mean a carboxylic acid compound including two or more carboxyl groups (—COOH). In order to form a cross-linkage with polyvinyl alcohol, there need to be two or more substituents capable of being reacted with a hydroxy group (—OH) of polyvinyl alcohol in one molecule of a cross-linking agent. Thus, the method for manufacturing a polarizer according to the present specification uses a polyvalent carboxylic acid compound including two or more carboxyl groups.

For example, polyvinyl alcohol may be reacted with polyvalent carboxylic acid, thereby introducing a cross-linking form such as the following structure into the polarizer without being limited thereto.

Polyvinyl alcohol     Polyvalent carboxylic acid

According to an exemplary embodiment of the present specification, a concentration index X of a polyvalent carboxylic acid compound remaining on the surface of the polyvinyl alcohol-based film after carrying out the third cross-linking step may satisfy the following Equation (1). In this case, the surface of the polyvinyl alcohol-based film may mean a depth from 0 to about 2 μm. The inventors of the present specification have found that in this case, a polarizing plate including the polarizer has a significantly low crack occurrence rate in the polarizing plate even under a high-temperature durability condition.

$$0.25 \leq X \leq 0.4 \qquad \text{Equation (1):}$$

In Equation (1), X means a value obtained by subtracting an integral value of an absorption spectrum at 1,580 cm$^{-1}$ to 1,780 cm$^{-1}$, which is obtained by being measured by means of attenuated total reflection (ATR) of the polarizer subjected to the cross-linking step using an aqueous solution which does not include a polyvalent carboxylic acid compound from an integral value of an absorption spectrum at 1,580 cm$^{-1}$ to 1,780 cm$^{-1}$, which is obtained by being measured by means of attenuated total reflection (ATR) of the polarizer subjected to the first to third cross-linking steps.

According to an exemplary embodiment of the present specification, the third cross-linking step may be performed by using an immersion method. For example, the third cross-linking step may be performed by impregnating the polyvinyl alcohol-based film in a cross-linking bath containing a third aqueous solution including a polyvalent carboxylic acid compound. Since a cleaning step is performed after the third cross-linking step in the related art, iodine, boric acid, and polyvalent carboxylic acid absorbed immediately in a previous step during the cleaning process may slip out, so that there is a problem in that physical properties of a finally manufactured polarizer are affected. In the present specification, since a separate cleaning step after the third cross-linking step need not be performed by performing the third cross-linking step using an immersion method, there is a merit in terms of process economic efficiency, and there is an advantage in that physical properties of a polarizer to be manufactured do not deteriorate.

According to an exemplary embodiment of the present specification, the first and second aqueous solutions may each include the boron compound in an amount of 0.5 wt % to 10 wt %, specifically 1 wt % to 6 wt %, and more specifically 1 wt % to 4 wt % based on 100 wt % of the first and second aqueous solutions. When the boron compound is included in an amount of less than 1 wt % based on 100 wt % of the aqueous solution, there are a problem in that wrinkles of the polarizer occur and a problem in that optical properties deteriorate because the cross-linking reaction of the boron compound is not sufficiently performed, and when the boron compound is included in an amount of more than 10 wt % based on 100 wt % of the aqueous solution, there is a problem in that it becomes difficult to perform a stretching step due to the cross-linking reaction with the excessive boron compound.

According to an exemplary embodiment of the present specification, the first and second aqueous solutions may each include the polyvalent carboxylic acid compound in an amount of 10 wt % to 150 wt %, specifically 20 wt % to 100 wt %, and more specifically 20 wt % to 80 wt % based on 100 wt % of the boron compound. When the polyvalent carboxylic acid compound is included in an amount of less than 10 wt % based on 100 wt % of the boron compound, an effect of efficiently improving shrinkage deformation may not be obtained because the addition of polyvalent carboxylic acid and the cross-linking reaction are not sufficiently performed. Specifically, it is preferred to satisfy the range in order to implement a much better effect of improving shrinkage deformation in a small thickness. Meanwhile, when the polyvalent carboxylic acid compound is included in an amount of more than 150 wt % based on 100 wt % of the boron compound, there is a problem in that wrinkles of the polarizer occur and a problem in that optical properties deteriorate because the cross-linking reaction of the boron compound is not effectively performed.

Meanwhile, the ratios of the boron compound and the polyvalent carboxylic acid compound to be included in the first and second aqueous solutions may be the same as each other, and may be different from each other, if necessary.

According to an exemplary embodiment of the present specification, the third aqueous solution may include the polyvalent carboxylic acid compound in an amount of 0.5 wt % to 10 wt %, specifically 1 wt % to 5 wt %, and more specifically 1 wt % to 3 wt % based on 100 wt % of the third aqueous solution. When the polyvalent carboxylic acid compound is included in an amount of less than 0.5 wt % based on 100 wt % of the third aqueous solution, an effect of reinforcing the cross-linking reaction of a hydroxy group of polyvinyl alcohol is minimal due to the addition of the polyvalent carboxylic acid compound, and when the polyvalent carboxylic acid compound is included in an amount of more than 10 wt % based on 100 wt % of the third aqueous solution, there is a problem in that a surface defect may be caused by the excessive concentration of the cross-linking agent.

According to another exemplary embodiment, the polyvalent carboxylic acid compound may be one or more selected from the group consisting of glutaric acid, succinic acid, malonic acid, oxalic acid, 1,2,3,4-butanetetracarboxylic acid, citric acid, malic acid, tartaric acid, and derivatives thereof. However, the polyvalent carboxylic acid compound is not limited thereby.

Figure 1:
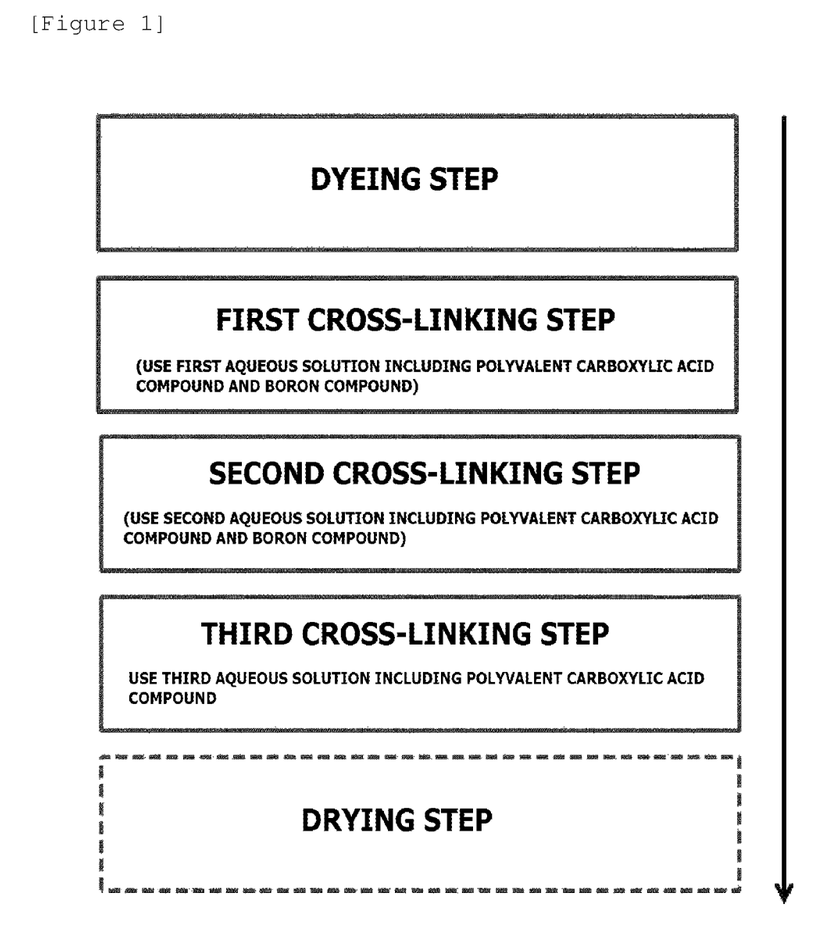
FIG. 1 is a flowchart of a method for manufacturing a polarizer according to an exemplary embodiment of the present specification.

Hereinafter, each step of the method for manufacturing a polarizer of the present specification will be described in more detail with reference to FIG. 1.

First, the dyeing step (hereinafter, referred to as 'dyeing step') is for dyeing an iodine molecule and/or a dichroic dye on a polyvinyl alcohol-based film, and the iodine molecule and/or the dichroic dye may enable a polarization having a specific vibration direction to be obtained by absorbing light vibrating in a stretching direction of a polarizer and allowing light vibrating in a perpendicular direction to pass through. In this case, the dyeing may be carried out by impregnating a polyvinyl alcohol-based film in a processing bath containing an iodine solution and/or a solution containing a dichroic dye.

In this case, as a solvent used in the solution of the dyeing step, water is generally used, but an organic solvent having compatibility with water may be added in a suitable amount. Meanwhile, iodine and/or a dichroic dye may be used in an amount of 0.06 part by weight to 0.25 part by weight based on 100 parts by weight of the solvent. When a dichroic material such as the iodine is included within the range, the transmittance of a polarizer manufactured after stretching may satisfy a range of 40% to 47%.

Meanwhile, when iodine is used as a dichroic material, it is preferred to additionally contain an auxiliary agent such as an iodide compound in order to improve the dyeing efficiency, and the auxiliary agent may be used at a ratio of 0.3 part by weight to 2.5 parts by weight based on 100 parts by weight of the solvent. In this case, the reason for adding an auxiliary agent such as the iodide compound is to increase the solubility of iodine to water because iodine has a low solubility to water. Meanwhile, the ratio of the iodine and the iodide compound blended is preferably 1:5 to 1:10 based on the weight.

Specific examples of the iodide compound which may be added include potassium iodide, lithium iodide, zinc iodide, aluminum iodide, lead iodide, copper iodide, barium iodide, calcium iodide, tin iodide, titanium iodide, or mixtures thereof, but are not limited thereto.

Meanwhile, it is preferred that the temperature of the processing bath is maintained at 25° C. to 40° C. When the temperature of the processing bath is lower than 25° C., the dyeing efficiency may be dropped, and when the temperature is higher than 40° C., a large amount of iodine is sublimed, so that the amount of iodine used may be increased.

In this case, the time for immersing a polyvinyl alcohol-based film in a processing bath is preferably 30 seconds to 120 seconds. The reason is that when the immersion time is less than 30 seconds, the polyvinyl alcohol-based film may not be uniformly dyed, and when the immersion time is more than 120 seconds, the dyeing is saturated, and as a result, the polyvinyl alcohol-based film need not be immersed any more.

Next, the first and second cross-linking steps are performed. As described above, stretching is performed along with cross-linking in the first and second cross-linking steps, respectively.

Meanwhile, the cross-linking and stretching step is performed so as to obtain a desired polarization property by aligning polymer chains in a predetermined direction while iodine and/or a dichroic dye are(is) adsorbed onto a polyvinyl alcohol polymer matrix, a dipping method, which is performed by dipping a polyvinyl alcohol-based film into an aqueous solution, may be generally used, but the method is not limited thereto, and the cross-linking and stretching step may also be performed by an application method or a spray method, which applies or sprays a solution including a cross-linking agent onto a polyvinyl alcohol-based film.

In this case, as the solvent used in the first and second aqueous solutions, water is generally used, but an organic solvent having compatibility with water may be added in a suitable amount.

Meanwhile, the temperature of the first and second aqueous solutions may vary depending on the amount of cross-linking agent and the stretching ratio, and is not limited to, but is generally preferably 30° C. to 60° C. Specifically, the temperature may be 33° C. to 60° C. or 35° C. to 60° C. In general, when the amount of cross-linking agent is increased, the temperature of a cross-linking bath is adjusted to a high temperature condition in order to improve the mobility of polyvinyl alcohol-based film chains, and when the amount of cross-linking agent is small, the temperature of the cross-linking bath is adjusted to a relatively low temperature condition. In this case, the time for immersing a polyvinyl alcohol-based film in an aqueous solution is preferably approximately 30 seconds to 120 seconds. The reason is that when the immersion time is less than 30 seconds, the polyvinyl alcohol-based film may not be uniformly cross-linked, and when the immersion time is more than 120 seconds, the cross-linking is saturated, and as a result, the polyvinyl alcohol-based film need not be immersed any more.

The solvents and temperatures used in the first and second aqueous solutions may be the same as each other, and may be different from each other depending on the need for securing the processability, and the like.

As a description on the polyvalent carboxylic acid compound and the boron compound which are a cross-linking agent included in the first and second aqueous solutions, the above-described content is applied as it is.

Meanwhile, the first and second aqueous solutions may additionally include an iodine-based compound in addition to the polyvalent carboxylic acid compound and the boron compound. In addition, an iodine-based compound included in the aqueous solution serves to adjust the polarization properties and the color. The iodine-based compound may be adopted without limitation as long as the iodine-based compound is an iodine-based compound known in the art, which may be used as an auxiliary agent in the dyeing step, and for example, potassium iodide, calcium iodide, lithium iodide, and the like may correspond to the iodine-based compound. Meanwhile, the iodine-based compound may be included in an amount of preferably 1 wt % to 10 wt % based on 100 wt % of each of the first and second aqueous solutions, but the amount is not limited thereto.

Meanwhile, for the stretching, it is preferred that the polyvinyl alcohol-based film is stretched at a stretching ratio of 4.5 times to 8 times. This is because polymer chains of the polyvinyl alcohol-based film need to be aligned in order to impart polarization performance to the polyvinyl alcohol-based film, and the alignment of the chains may not sufficiently occur at a stretching ratio of less than 4.5 times and the chains of the polyvinyl alcohol-based film may be broken at a stretching ratio of more than 8 times.

In this case, it is preferred that the stretching is performed at a stretching temperature of 30° C. to 60° C. The stretching temperature may vary depending on the content of cross-linking agent, and the temperature with the range is preferred because at a temperature of less than 30° C., the stretching efficiency may be reduced due to the deterioration in mobility of the polyvinyl alcohol-based film chains and when the stretching temperature is more than 60° C., the strength may be weak due to the softening of the polyvinyl alcohol-based film.

Meanwhile, the stretching may be performed by using a polyvinyl alcohol-based film alone, and may be performed by a method of stacking a base film on a polyvinyl alcohol-based film, and then stretching the polyvinyl alcohol-based film and the base film together. When a polyvinyl alcohol-based film having a small thickness (for example, a PVA film having a thickness of 60 μm or less) is stretched, the base film is used in order to prevent the polyvinyl alcohol-based film from being ruptured during the stretching process, and the base film may be used in order to manufacture a thin PVA polarizer having a thickness of 10 μm or less.

In this case, as the base film, polymer films having a maximum stretching ratio of 5 times or more under a temperature condition of 20° C. to 85° C. may be used, and for example, it is possible to use a high-density polyethylene film, a polyurethane film, a polypropylene film, a polyolefin film, an ester-based film, a low-density polyethylene film, a high-density polyethylene and low-density polyethylene co-extrusion film, a co-polymer resin film in which ethylene vinyl acetate is contained in high-density polyethylene, an acrylic film, a polyethylene terephthalate film, a polyvinyl alcohol-based film, a cellulose-based film, and the like. Meanwhile, the maximum stretching ratio means a stretching ratio immediately before the rupture occurs.

Further, a method of stacking the base film and the polyvinyl alcohol-based film is not particularly limited. For example, the base film and the polyvinyl alcohol-based film may also be stacked through a bonding agent or an adhesive agent, and may also be stacked by a method of placing a polyvinyl alcohol-based film on a base film without a separate medium. Further, the stacking may be performed by a method of co-extruding a resin which forms a base film and a resin which forms a polyvinyl alcohol-based film, or a method of coating a polyvinyl alcohol-based resin onto a base film.

Meanwhile, the base film may be removed by being separated from a polarizer when stretching is completed, but the next step may also be performed without removing the base film. In this case, the base film may be used as a polarizer protective film to be described below, and the like.

Next, the third cross-linking step is performed.

As described above, the cross-linking step is performed by using a third aqueous solution, and the third aqueous solution includes a polyvalent carboxylic acid compound, but does not include a boron compound.

A polyvalent carboxylic acid compound included in the third aqueous solution may be the same as or different from the polyvalent carboxylic acid compound included in the first and/or second aqueous solution(s).

Meanwhile, the content of the polyvalent carboxylic acid compound included in the third aqueous solution is the same as that described above.

The solvent used in the third aqueous solution may be the same as or different from the solvent used in the first and second aqueous solutions, and water is generally used, but an organic solvent such as alcohols having compatibility with water and DMSO may be added in a suitable amount.

Meanwhile, the temperature of the third aqueous solution is not limited to, but is generally preferably 20° C. to 40° C. Specifically, the temperature may be 20° C. to 35° C. or 20° C. to 30° C. When the temperature of the third aqueous solution satisfies the range, the cross-linking reaction may effectively occur, and there is an advantage in that the efficiency of the processability is increased.

As described above, the third cross-linking step may be performed by using an immersion method. In this case, the time for immersing the polyvinyl alcohol-based film in the third aqueous solution is preferably approximately 1 second to 10 seconds. The reason is that when the immersion time is less than 1 second, an effect of removing a boron compound remaining in the polyvinyl alcohol-based film and reinforcing a cross-linking reaction with polyvinyl alcohol is minimal, and when the time is more than 10 seconds, the polyvinyl alcohol-based film need not be immersed any more due to the saturation of the cross-linking.

According to an exemplary embodiment of the present specification, after the third cross-linking step, a step of drying the polyvinyl alcohol-based film (hereinafter, referred to as 'a drying step') may be performed, if necessary.

The drying step is performed in order to remove water or a solvent remaining on the polarizer and correct the appearance deformation of the polarizer and may be performed by a method for drying a polarizer known in the art, and for example, the drying step may also be performed by a method for allowing a polarizer to pass through a heating roll, and may also be performed by a method for drying a polarizer in an oven.

The method for manufacturing a polarizer according to an exemplary embodiment of the present specification may include an additional step known in the art, if necessary. For example, the manufacturing method may additionally include a step of swelling a polyvinyl alcohol-based film, a complementary color step of complementing the color of a polarizer, and the like prior to the dyeing step.

An exemplary embodiment of the present specification also provides a polarizer manufactured according to the above-described exemplary embodiments. The polarizer manufactured by the manufacturing method according to an exemplary embodiment of the present specification exhibits the above-described effect. That is, dimensional stability, durability, and the like are excellent.

Meanwhile, the smaller the thickness of the polarizer is, the more maximized the above-described effect is. According to an exemplary embodiment of the present specification, the polarizer manufactured according to the manufacturing method may have a thickness of 5 µm to 25 µm.

According to an exemplary embodiment of the present specification, the polarizer having the boron content may have a thickness of 5 µm to 25 µm.

An exemplary embodiment of the present specification also provides a polarizing plate having a crack occurrence rate of 5% or less after a durability evaluation under a condition of being left to stand at any one temperature selected from 80° C. to 120° C. for 24 hours, in which the crack occurrence rate means a ratio of samples in which cracks occur to 100 samples produced under the same conditions. In this case, among the durability evaluation conditions, any one temperature selected from 80° C. to 120° C. means any one specific temperature selected from 80° C. to 120° C., and the polarizer shrinkage rate value need not be satisfied for all the temperatures within a range of 80° C. to 120° C. For example, according to an exemplary embodiment of the present specification, the polarizer may have a crack occurrence rate of 5% or less after a durability evaluation under a condition of being left to stand at a temperature of 100° C. for 24 hours. Meanwhile, the polarizing plate may include the above-described polarizer according to an exemplary embodiment.

An exemplary embodiment of the present specification also provides a polarizing plate having a crack occurrence rate of 10% or less after a durability evaluation under a condition of being left to stand at any one temperature selected from 80° C. to 120° C. for 24 hours, in which the crack occurrence rate means a ratio of samples in which cracks occur to 6 samples produced under the same conditions.

The crack occurrence rate may be preferably 8% or less, and more preferably 5% or less. According to an exemplary embodiment of the present specification, the crack occurrence rate is 1% or less.

Further, an exemplary embodiment of the present specification provides a polarizing plate having a shrinkage rate of 0.01% to 0.03% in a machine direction (MD) after a durability evaluation under a condition of being left to stand at any one temperature selected from 20° C. to 30° C. for 24 hours after the polarizing plate is left to stand at any one temperature from 60° C. to 70° C. for 48 hours. In this case, among the durability evaluation conditions, any one temperature selected from 60° C. to 70° C. means any one specific temperature selected from 60° C. to 70° C., and the polarizing plate shrinkage rate value need not be satisfied for all the temperatures within a range of 60° C. to 70° C. Among the durability evaluation conditions, any one temperature selected from 20° C. to 30° C. also means any one specific temperature selected likewise, and the polarizing plate shrinkage rate value need not be satisfied for all the temperatures within a range of 20° C. to 30° C. For example, according to an exemplary embodiment of the present specification, the polarizing plate may be a polarizing plate having a shrinkage rate of 0.01% to 0.03% in a machine direction (MD) after a durability evaluation under a condition of being left to stand at a temperature of 25° C. for 24 hours after the polarizing plate is left to stand at a temperature of 65° C. for 48 hours.

According to an exemplary embodiment of the present specification, a polarizer included in the polarizing plate having a shrinkage rate of 0.01% to 0.03% in a machine direction (MD) after the durability evaluation may have a thickness of 5 µm to 25 µm.

Meanwhile, according to an exemplary embodiment of the present specification, the polarizing plate may be a polarizing plate having a protective film provided on one surface of a polarizer.

According to another exemplary embodiment of the present specification, the polarizing plate having a protective film provided on one surface of a polarizer may be a polarizing plate having an adhesive layer provided on the other surface of the polarizer.

Recently, a need for making a polarizing plate thinner has been increased for the trend to make display devices thinner and alleviating the bending of a panel, and therefore, a polarizing plate having a protective film provided on only one surface of the polarizer has been proposed. A polarizing plate having a protective film provided on only one surface of a polarizer may have a smaller thickness than that of a polarizing plate having a protective film provided on both surfaces of a polarizer in the related art, and has an advantage in that the manufacturing costs are also low and a high contrast ratio may be implemented by removing an increase in black luminance resulting from the retardation of a protective film such as a TAC film. In particular, when the polarizing plate is included in an IPS mode liquid crystal display device, a high contrast ratio may be implemented. However, since a pressure-sensitive adhesive (PSA) agent is provided on a surface of a polarizer on which a protective film is not provided such that the polarizing plate is attached to a panel, the polarizing plate has a problem in that the durability is weaker than that of a polarizing plate having a protective film provided on both surfaces of a polarizer, and the crack occurrence rate in the polarizing plate is high. The problem is responsible for a light leakage phenomenon when the polarizing plate is attached to a panel. Researchers of the present specification have found that when a polarizing plate is manufactured by providing a protective film on only one surface of the polarizer according to an exemplary embodiment of the present specification, the aforementioned problem does not occur. In other words, the polarizing plate according to an exemplary embodiment of the present specification is very advantageous in being applied as a polarizing plate having a protective film provided on only one surface of a polarizer.

The protective film provided on one surface of the polarizer may be adopted without limitation as long as the protective film is a general protective film known in the art, and examples thereof include TAC, COP, an acrylic film, and the like.

An exemplary embodiment of the present specification also provides an image display device including: a display panel; and the above-described polarizing plate according to the exemplary embodiment, which is attached onto one surface or both surfaces of the display panel.

The display panel may be a liquid crystal panel, a plasma panel, and an organic light emitting panel, and accordingly, the image display device may be a liquid crystal display (LCD) device, a plasma display panel (PDP), and an organic light emitting display (OLED) device.

More specifically, the image display device may be a liquid crystal display device including a liquid crystal panel and polarizing plates each provided on both surfaces of the liquid crystal panel, and in this case, at least one of the polarizing plates may be a polarizing plate manufactured by the above-described method for manufacturing a polarizing plate according to an exemplary embodiment of the present specification.

In this case, the type of liquid crystal panel included in the liquid crystal display device is not particularly limited. For example, publicly-known panels, such as a passive matrix-type panel such as a twisted nematic (TN), super twisted nematic (STN), ferroelectric (F) or polymer dispersed (PD) panel; an active matrix-type panel such as a two terminal or three terminal panel; and an in-plane switching (IPS) panel and a vertical alignment (VA) panel, may be all applied without being limited by type. Furthermore, other configurations constituting the liquid crystal display device, for example, the type of upper and lower substrates (for example, a color filter substrate or an array substrate) is not particularly limited, and a configuration publicly-known in the art may be adopted without limitation.

Hereinafter, the present specification will be described in more detail through Examples. However, the following Examples are provided for exemplifying the present specification, and the scope of the present specification is not limited thereby.

MODE FOR INVENTION

Example 1

A polyvinyl alcohol film having a thickness of 30 µm was immersed and dyed in an aqueous solution containing 0.1 wt % of iodine and 1 wt % of potassium iodide (KI) at 30° C. for 40 seconds. In this case, the polyvinyl alcohol film was stretched 3 times in the dyeing solution. Next, a cumulative stretching ratio was allowed to be 3.5 times while immersing the polyvinyl alcohol film in a first aqueous solution containing 1.5 wt % of glutaric acid and 1 wt % of boric acid at 35° C. for 20 seconds. A cumulative stretching ratio was allowed to be 5.4 times while immersing the polyvinyl alcohol film in a second aqueous solution containing 1 wt % of glutaric acid and 2.5 wt % of boric acid at 54° C. for 2 minutes. Next, the polyvinyl alcohol film was immersed in a third aqueous solution containing 1 wt % of glutaric acid at 35° C. for 3 seconds. Thereafter, a polarizer having a thickness of about 12 µm was manufactured by drying the film at 80° C. in an oven for 2 minutes. An acrylic film having a thickness of 40 µm was stacked on one surface of the manufactured polarizer by using a bonding agent, and a polarizing plate was manufactured by applying an adhesive agent onto the other surface thereof.

Example 2

A polarizing plate was manufactured in the same manner as in Example 1, except that the content of glutaric acid in the third aqueous solution was 1.5 wt %.

Example 3

A polarizing plate was manufactured in the same manner as in Example 1, except that the content of glutaric acid in the third aqueous solution was 2 wt %.

Comparative Example 1

A polarizing plate was manufactured in the same manner as in Example 1, except that the contents of glutaric acid in the first and second aqueous solutions were all 0, and the third cross-linking step was not performed.

Comparative Example 2

A polarizing plate was manufactured in the same manner as in Example 1, except that the content of glutaric acid in the third aqueous solution was 0.3 wt %.

Comparative Example 3

A polarizing plate was manufactured in the same manner as in Example 1, except that the content of glutaric acid in the third aqueous solution was 5 wt %.

Comparative Example 4

A polarizing plate was manufactured in the same manner as in Example 1, except that the third cross-linking step was not performed.

Comparative Example 5

A polarizing plate was manufactured in the same manner as in Example 1, except that the contents of glutaric acid in the first and second aqueous solutions were all 0.

<Experimental Example> High-Temperature Durability Evaluation of Polarizers Manufactured According to Examples 1 to 3 and Comparative Examples 1 to 5

The polarizing plates manufactured according to Examples 1 to 3 and Comparative Examples 1 to 5 were cut into a size of 10 mm×160 mm. In this case, the stretching direction (MD direction) of the polarizing plate was assigned as a major axis, and a direction perpendicular to the major axis was assigned as a minor axis. A sample was prepared by stacking the polarizing plate on glass through an applied adhesive agent.

The end of a sensor connected to a displacement measuring system (DMS) apparatus is composed of a part from which laser is emitted and a part in which laser is sensed. In the sample, the major axis of the polarizing plate is positioned so as to form a straight line with laser emitted from the sensor, and a reflective body is attached onto one end adjacent to the sensor. The sensor is an apparatus which may continuously record information on the distance between the sensor and the reflective body by using a principle in which laser emitted from the sensor collides with the reflective body at the end of the sample and then is reflected back and sensed. Accordingly, the polarizing plate is shrunk as the distance between the sensor and the reflective body becomes far away, and in contrast, the polarizing plate is expanded when the distance between the sensor and the reflective body becomes close.

A dimensional change rate may be calculated by the following Equation from an initial value which is stabilized at a temperature of 25° C. and a relative humidity of 50% and a final value after the polarizing plate is shrunk at 65° C. in an oven for 48 hours, and then restored at a temperature of 25° C. and a relative humidity of 50% for 24 hours.

Dimensional change rate (%)=(a length of the polarizing plate after a durability evaluation−an initial length of the polarizing plate)/(an initial strength of the polarizing plate)×100

Since the polarizing plate mostly exhibits a tendency to be shrunk during the durability evaluation, the length after the durability evaluation becomes short as compared to the initial length, so that the dimensional change rate has a negative value. A dimensional change rate close to 0 means that the change in length is not significant by the durability evaluation. That is, the dimensional change rate close to 0 means that the dimensional stability is high.

Further, the sample was left to stand at 100° C. for 24 hours, and then it was evaluated by the unaided eye whether the appearance of the polarizing plate was deformed. In the following Table 1, the crack occurrence rate in the polarizing plate means a ratio of samples in which cracks occur on the appearance of the polarizing plate to 6 samples produced under the same conditions.

According to the Experimental Examples, the crack occurrence rate after the measured durability was evaluated and the shrinkage rate (%) of the polarizing plate in a stretching direction (MD direction) were calculated, and the results are summarized in the following Table 1.

Meanwhile, the definition of the concentration index X of the polyvalent carboxylic acid compound remaining on the surface of the polarizer included in the polarizing plate is the same as that described above.

TABLE 1

| Classification | | | | | | | | |
|---|---|---|---|---|---|---|---|---|
| | Stretching and Cross-linking step | | | | | | Polarizing plate high-temperature durability evaluation | |
| | First cross-linking step | | Second cross-linking step | | Third cross-linking step | ATR measurement | Crack occurrence | Shrinkage rate in MD direction |
| Concentration | Boric acid (wt %) | Glutaric acid (wt %) | Boric acid (wt %) | Glutaric acid (wt %) | Glutaric acid (wt %) | value Concentration index X | rate (%) in polarizing plate | after durability evaluation |
| Example 1 | 1 | 1.5 | 2.5 | 1 | 1 | 0.275 | 0 | 0.018 |
| Example 2 | 1 | 1.5 | 2.5 | 1 | 1.5 | 0.354 | 0 | 0.023 |
| Example 3 | 1 | 1.5 | 2.5 | 1 | 2 | 0.384 | 0 | 0.029 |
| Comparative Example 1 | 1 | 0 | 2.5 | 0 | 0 | 0 | 67 | 0.092 |

TABLE 1-continued

| | Stretching and Cross-linking step | | | | | | Polarizing plate high-temperature durability | |
|---|---|---|---|---|---|---|---|---|
| | First cross-linking step | | Second cross-linking step | | Third cross-linking step | ATR measurement | evaluation Crack occurrence rate | Shrinkage rate in MD direction |
| Concentration | Boric acid (wt %) | Glutaric acid (wt %) | Boric acid (wt %) | Glutaric acid (wt %) | Glutaric acid (wt %) | value Concentration index X | (%) in polarizing plate | after durability evaluation |
| Comparative Example 2 | 1 | 1.5 | 2.5 | 1 | 0.3 | 0.220 | 17 | 0.035 |
| Comparative Example 3 | 1 | 1.5 | 2.5 | 1 | 5 | 0.540 | 33 | 0.053 |
| Comparative Example 4 | 1 | 1.5 | 2.5 | 1 | 0 | 0.210 | 33 | 0.041 |
| Comparative Example 5 | 1 | 0 | 2.5 | 0 | 1 | 0.103 | 50 | 0.055 |

Referring to Table 1, it could be seen that a polarizing plate including a polarizer manufactured according to the method for manufacturing a polarizer according to an exemplary embodiment of the present specification and having a protective film provided on only one surface of the polarizer was significantly low in crack occurrence rate and shrinkage rate in a stretching direction (MD direction). Furthermore, in the case of Examples 1 to 3, cracks in the polarizing plate did not occur. No occurrence of cracks consequently means that the dimensional stability, durability, and the like of the polarizing plate are excellent.

Further, it can be known that the polarizing plate including a polarizer manufactured by the method for manufacturing a polarizer according to an exemplary embodiment of the present specification and having a protective film provided on only one surface of the polarizer had a low shrinkage rate in a stretching direction (MD direction).

When specifically observed, it can be known that in Comparative Example 1 in which cross-linking was performed by using an aqueous solution including only a boron compound, the crack occurrence rate and the shrinkage rate in a stretching direction (MD direction) were high due to the short cross-linking chains of the boron compound.

Meanwhile, it can be known that Comparative Examples 2 and 3 in which the first and second cross-linking and stretching steps were performed by using an aqueous solution including both a polyvinyl carboxylic acid compound and a boron compound had lower crack occurrence rate and the shrinkage rate in the stretching direction (MD direction) than those of Comparative Example 1, but fail to satisfy Equation (1), and as a result, the effect of improving dimensional stability and durability, and the like was not efficiently implemented.

It can be seen that Comparative Example 4 in which the first and second cross-linking and stretching steps were performed by using an aqueous solution including both a polyvalent carboxylic acid compound and a boron compound, but the third cross-linking step was not performed also had lower crack occurrence rate and shrinkage rate in a stretching direction (MD direction) than those of Comparative Example 1, but the effect of improving the dimensional stability and the durability, and the like was not significant. The insignificant effect is a problem resulting from the failure to remove the boron compound remaining on the surface of the polarizer because the third cross-linking step is not performed.

Meanwhile, it can be seen that in the case of Comparative Example 5 in which a polyvalent carboxylic acid compound was used only in the third cross-linking step, the durability and dimensional stability were weak because the cross-linking reaction by the polyvalent carboxylic acid compound did not effectively occur.

Figure 2:
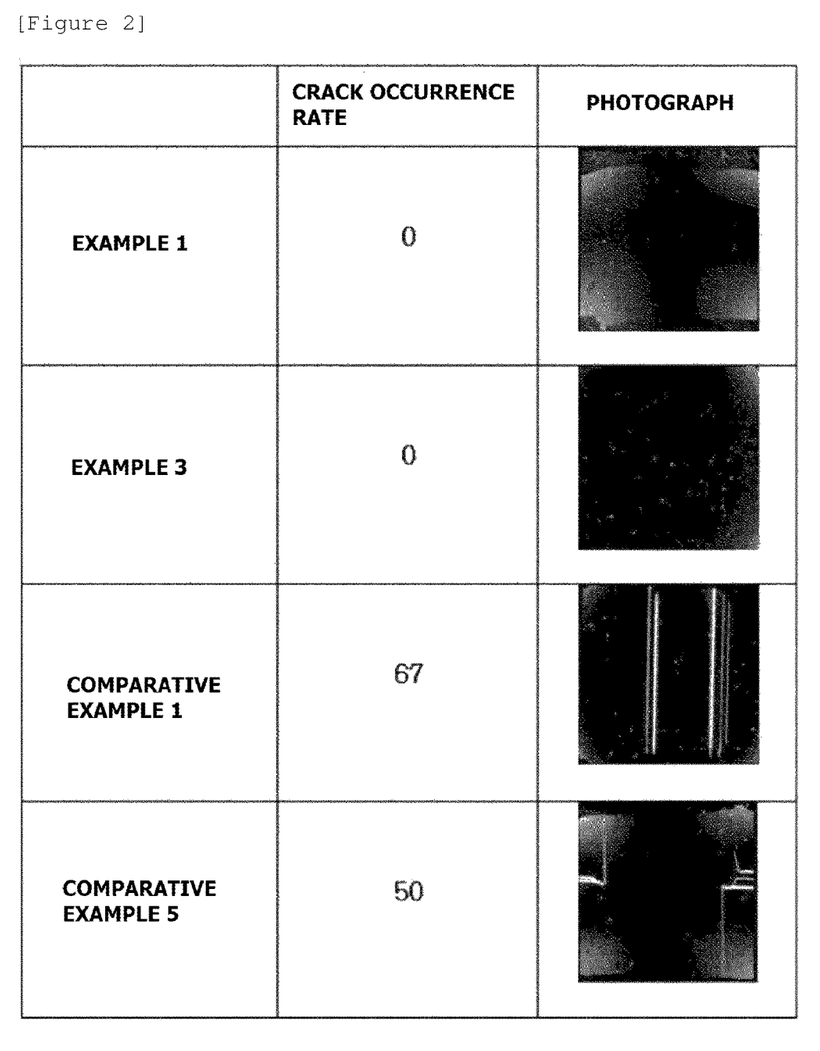
FIG. 2 is a microscope photograph in which it is captured whether cracks occur on the polarizing plates according to Examples 1 and 3 and Comparative Examples 1 and 5.

FIG. 2 illustrates a result of observing the polarizing plates having a protective film provided on only one surface of the polarizers according to Example 1 and Example 3 and Comparative Example 1 and Comparative Example 5 by using the optical microscopy. It could be confirmed that the crack occurrence rates in Examples 1 and 3 were 0%, while the polarizing plate having a protective film provided on one surface of the polarizer according to Comparative Example 1 had a crack occurrence rate of 67%, and the polarizing plate having a protective film provided on only one surface of the polarizer according to Comparative Example 5 had a crack occurrence rate of 50%. For the crack occurrence rate, the crack occurrence rate was obtained as the number of samples in which cracks occurred on the appearance of the polarizing plate in 100 polarizing plates having a protective film provided on only one surface of the polarizer, which were produced under the same conditions based on the total area of the polarizing plate having a protective film provided on one surface of the entire polarizer.

The invention claimed is:

1. A method for manufacturing a polarizer, the method comprising:
    a step of dyeing at least one dye of iodine and dichroic dyes on a polyvinyl alcohol-based film;
    a first cross-linking step of cross-linking the polyvinyl alcohol-based film and the dye by using a first aqueous solution including a polyvalent carboxylic acid compound and a boron compound;
    a second cross-linking step of cross-linking the polyvinyl alcohol-based film and the dye by using a second aqueous solution including a polyvalent carboxylic acid compound and a boron compound; and a third cross-linking step of cross-linking the polyvinyl alcohol-based film and the dye by using a third aqueous solution including a polyvalent carboxylic acid compound, wherein in the first cross-linking step and the second cross-linking step, stretching is performed along with cross-linking.

2. The method of claim 1, wherein a concentration index X of the polyvalent carboxylic acid compound remaining on the surface of the polyvinyl alcohol-based film after performing the third cross-linking step satisfies the following Equation (1):

$$0.25 \leq X \leq 0.4 \qquad \text{Equation (1):}$$

in Equation (1), X means a value obtained by subtracting an integral value of an absorption spectrum at 1,580 cm$^{-1}$ to 1,780 cm$^{-1}$, which is obtained by being measured by means of attenuated total reflection (ATR) of the polarizer subjected to the cross-linking step using an aqueous solution which does not include a polyvalent carboxylic acid compound from an integral value of an absorption spectrum at 1,580 cm$^{-1}$ to 1,780 cm$^{-1}$, which is obtained by being measured by means of attenuated total reflection (ATR) of the polarizer subjected to the first to third cross-linking steps.

3. The method of claim 1, wherein the third cross-linking step is performed by using an immersion method.

4. The method of claim 1, wherein the boron compound is each comprised in an amount of 0.5 wt % to 10 wt % based on 100 wt % of the first and second aqueous solutions.

5. The method of claim 1, wherein the polyvalent carboxylic acid compound in the first aqueous solution and the second aqueous solution is each comprised in an amount of 10 wt % to 150 wt % based on 100 wt % of the boron compound.

6. The method of claim 1, wherein the third aqueous solution comprises the polyvalent carboxylic acid compound in an amount of 0.5 wt % to 10 wt % based on 100 wt % of the third aqueous solutions.

7. The method of claim 1, wherein the polyvalent carboxylic acid compounds are one or more selected from the group consisting of glutaric acid, succinic acid, malonic acid, oxalic acid, 1,2,3,4-butanetetracarboxylic acid, citric acid, malic acid, tartaric acid, and derivatives thereof.

8. The method of claim 1, further comprising a step of drying the polyvinyl alcohol-based film after the third cross-linking step.

9. A polarizer manufactured by the method according to claim 1.

10. The polarizer of claim 9, comprising: a boron element in an amount of 0.5 wt % to 5 wt % based on 100 wt % of the polarizer.

11. A polarizing plate comprising the polarizer according to claim 9.

12. The polarizing plate of claim 11, wherein the polarizing plate has a shrinkage rate of 0.01% to 0.03% in a machine direction (MD) after a durability evaluation under a condition of being left to stand at any one temperature selected from 20° C. to 30° C. for 24 hours after the polarizing plate is left to stand at any one temperature selected from 60° C. to 70° C. for 48 hours.

13. An image display device comprising:
a display panel; and
the polarizing plate according to claim 12, which is attached onto one surface or both surfaces of the display panel.

14. The polarizing plate of claim 11, wherein the polarizing plate has a crack occurrence rate of 10% or less after a durability evaluation under a condition of being left to stand at any one temperature selected from 80° C. to 120° C. for 24 hours.

15. The polarizing plate of claim 11, wherein the polarizing plate has a protective film provided on one surface of the polarizer.

16. The polarizing plate of claim 15, wherein the protective film is provided to be brought into contact with the polarizer while an adhesive layer is provided on the other surface of the polarizer.

17. An image display device comprising:
a display panel; and
the polarizing plate according to claim 11, which is attached onto one surface or both surfaces of the display panel.

* * * * *